United States Patent
Chung et al.

(10) Patent No.: US 10,089,979 B2
(45) Date of Patent: Oct. 2, 2018

(54) SIGNAL PROCESSING ALGORITHM-INTEGRATED DEEP NEURAL NETWORK-BASED SPEECH RECOGNITION APPARATUS AND LEARNING METHOD THEREOF

(71) Applicant: ELECTRONICS AND TELECOMMUNICATIONS RESEARCH INSTITUTE, Daejeon (KR)

(72) Inventors: Hoon Chung, Daejeon (KR); Jeon Gue Park, Daejeon (KR); Sung Joo Lee, Daejeon (KR); Yun Keun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 105 days.

(21) Appl. No.: 14/737,907

(22) Filed: Jun. 12, 2015

(65) Prior Publication Data

US 2016/0078863 A1     Mar. 17, 2016

(30) Foreign Application Priority Data

Sep. 16, 2014   (KR) .......................... 10-2014-0122803

(51) Int. Cl.
  *G10L 15/00*   (2013.01)
  *G10L 15/16*   (2006.01)
(52) U.S. Cl.
  CPC .................................. *G10L 15/16* (2013.01)

(58) Field of Classification Search
  CPC ....................................................... G10L 15/16
  See application file for complete search history.

(56) References Cited

U.S. PATENT DOCUMENTS

| | | | |
|---|---|---|---|
| 7,567,252 B2 * | 7/2009 | Buck | G06F 17/16 345/501 |
| 7,702,505 B2 | 4/2010 | Jung | |
| 7,827,031 B2 | 11/2010 | Albesano et al. | |
| 8,775,341 B1 * | 7/2014 | Commons | G06N 3/0454 706/20 |

(Continued)

FOREIGN PATENT DOCUMENTS

| | | |
|---|---|---|
| KR | 10-2008-0056069 A | 6/2008 |
| KR | 10-0893154 B1 | 4/2009 |

OTHER PUBLICATIONS

George E. Dahl et al., "Context-Dependent Pre-Trained Deep Neural Networks for Large-Vocabulary Speech Recognition", Jan. 2012, pp. 30-42, vol. 20, No. 1, IEEE.

*Primary Examiner* — Kevin Ky (57) ABSTRACT

Provided are a signal processing algorithm-integrated deep neural network (DNN)-based speech recognition apparatus and a learning method thereof. A model parameter learning method in a deep neural network (DNN)-based speech recognition apparatus implementable by a computer includes converting a signal processing algorithm for extracting a feature parameter from a speech input signal of a time domain into signal processing deep neural network (DNN), fusing the signal processing DNN and a classification DNN, and learning a model parameter in a deep learning model in which the signal processing DNN and the classification DNN are fused.

10 Claims, 5 Drawing Sheets

(56) References Cited

U.S. PATENT DOCUMENTS

| | | | |
|---|---|---|---|
| 2005/0197977 A1* | 9/2005 | Buck | G06F 17/16 |
| | | | 706/12 |
| 2008/0147391 A1 | 6/2008 | Jeong et al. | |
| 2012/0166194 A1 | 6/2012 | Jung et al. | |
| 2014/0149112 A1* | 5/2014 | Kalinli-Akbacak | G10L 15/04 |
| | | | 704/232 |
| 2014/0214417 A1* | 7/2014 | Wang | G10L 17/18 |
| | | | 704/232 |
| 2015/0019214 A1* | 1/2015 | Wang | G10L 15/34 |
| | | | 704/232 |

\* cited by examiner

SIGNAL PROCESSING ALGORITHM-INTEGRATED DEEP NEURAL NETWORK-BASED SPEECH RECOGNITION APPARATUS AND LEARNING METHOD THEREOF

CROSS-REFERENCE TO RELATED APPLICATIONS

This application claims priority under 35 U.S.C. § 119 to Korean Patent Application No. 10-2014-0122803, filed on Sep. 16, 2014, the disclosure of which is incorporated herein by reference in its entirety.

TECHNICAL FIELD

The present invention relates to a speech recognition apparatus and a learning method thereof, and more particularly, to a signal processing algorithm-integrated deep neural network (DNN)-based speech recognition apparatus and a learning method thereof.

BACKGROUND

Recently, research into an application of an effective pattern recognition method of human beings to an actual computer has been actively conducted as a solution to classification input patterns frequently encountered in an engineering field into particular groups.

Among various computer-application studies is a study of an artificial neural network ergonomically modeling cell structures of human beings in which an effective pattern recognition takes place. In order to solve the problem of classification of input patterns into particular groups, an artificial neural network uses an algorithm imitating human beings' capability of learning. Through this algorithm, an artificial neural network may generate mapping between an input pattern and an output pattern, which is expressed that the artificial neural network has learning ability. Also, the artificial neural network has generalization capability to generate a relatively proper output with respect to an input pattern which has not been used for learning, on the basis of learning results. Due to the two typical performance of learning and generalization, the artificial neural network is applied to a problem which is hardly solved by an existing sequential programming method. The artificial neural network has a wide usage range and is actively applied to pattern classification, continuous mapping, non-linear system identification, non-linear control, robot control field, and the like.

The artificial neural network represents an operation model implemented with software or hardware imitating computation capability of a biological system using a large number of artificial neurons connected by connection lines. In the artificial neural network, artificial neurons formed by simplifying functions of biological neurons are used. The artificial neurons are connected through connection lines having connection strength to perform human beings' cognitive working or a learning process. The connection strength is a particular value of the connection lines, which is also called a connection weighted value. Learning of the artificial neural network may be divided into supervised learning and unsupervised learning. Supervised learning refers to a method of putting input data and corresponding output data together in a neural network and updating connection strength of connection lines such that output data corresponding to the input data is output. Typical learning algorithms include a delta rule and back propagation learning.

Unsupervised learning refers to a method of learning connection strength by an artificial neural network itself using only input data without a target value. Unsupervised learning is a method of updating connection weighted values based on correlation between input patterns.

Figure 1:
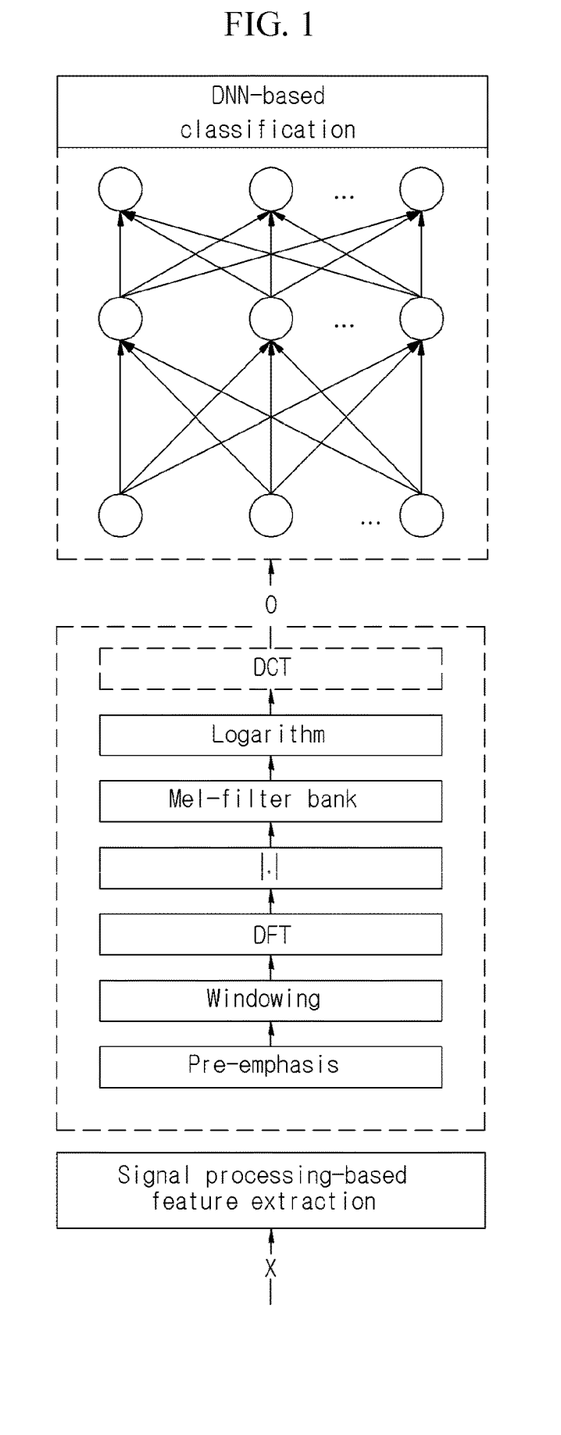
FIG. 1 is a view illustrating a general deep neural network-based speech recognition apparatus.

As illustrated in FIG. 1, a speech signal processing procedure in a general speech recognition system includes a step of extracting a feature parameter (O) through a process of canceling noise from an input speech signal (X) in a time domain, extracting features, and normalization, and a step of obtaining a word (W) outputting a maximum likelihood with respect to the feature parameter (O). This may be expressed as Equation (1) below.

$$W^* = \mathrm{argmax}_w P(w/O) \quad (1)$$

Namely, the current speech recognition ends up with searching for a word (W) having a maximum likelihood with respect to a converted feature parameter (O), rather than obtaining a word having a maximum likelihood with respect to the speech input signal (X) in the time domain. The array of signal processing procedure for extracting features appropriate for recognition of the voice input signal (X) in the time domain may be expressed as Equation (2) below.

$$O = f(X; \theta_p) \quad (2)$$

where O denotes the feature parameter, X denotes the speech input signal, and $\theta_p$ denotes a model parameter in a signal processing algorithm.

However, in the general speech recognition system described above, the model parameter ($\theta_p$) adjusting a signal processing procedure for obtaining the feature parameter (O) from the speech input signal (X) in the time domain is not explicitly set to a value for maximizing speech recognition performance. In general, a signal processing function is extracted by modeling a speech generation or a recognition process, and it may be implicitly set toward improvement of speech recognition performance but not explicitly set to satisfy a reference for maximizing speech recognition performance.

SUMMARY

Accordingly, the present invention provides a method for explicitly optimizing a model parameter in a signal processing procedure by integrating a signal processing algorithm for extracting a feature parameter into a deep neural network (DNN)-based speech recognition apparatus.

The object of the present invention is not limited to the aforesaid, but other objects not described herein will be clearly understood by those skilled in the art from descriptions below.

In one general aspect, a model parameter learning method in a deep neural network (DNN)-based speech recognition apparatus implementable by a computer includes: converting a signal processing algorithm for extracting a feature parameter from a speech input signal of a time domain into signal processing deep neural network (DNN); fusing the signal processing DNN and a classification DNN; and learning a model parameter in a deep learning model in which the signal processing DNN and the classification DNN are fused.

The step of the converting a signal processing algorithm may include converting a plurality of linear operations forming the signal processing algorithm into a single linear operation by using a matrix inner product or outer product.

The step of the fusing the signal processing DNN and a classification DNN may include inputting a feature parameter output from the signal processing DNN to the classification DNN.

The step of the learning a model parameter may include adjusting a model parameter to generate a target output value with respect to the speech input signal of the time domain, and preferably, determining a model parameter with which an error of an output value with respect to the speech input signal of the time domain is minimized by using a back-propagation learning algorithm.

In another general aspect, a signal processing algorithm-integrated deep neural network-based speech recognition apparatus including at least one processor and a non-volatile memory storing a code executed by the at least one processor, wherein the processor converts a signal processing algorithm for extracting a feature parameter from a speech input signal of a time domain into a signal processing deep neural network (DNN), fuses the signal processing DNN and a classification DNN, and learns a model parameter in a deep learning model in which the signal processing DNN and the classification DNN are fused.

The processor may convert a plurality of linear operations forming the signal processing algorithm into a single linear operation by using a matrix inner product or outer product.

The processor may input the feature parameter output from the signal processing DNN to the classification DNN.

The processor may adjust a model parameter to generate a target output value with respect to the speech input signal of the time domain, and preferably, determines a model parameter with which an error of an output value with respect to the speech input signal of the time domain is minimized by using a back-propagation learning algorithm.

Other features and aspects will be apparent from the following detailed description, the drawings, and the claims.

DETAILED DESCRIPTION OF EMBODIMENTS

Hereinafter, embodiments of the present invention will be described in detail with reference to the accompanying drawings.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In the following description, the technical terms are used only for explaining a specific exemplary embodiment while not limiting the present invention. The terms of a singular form may include plural forms unless specifically mentioned.

Hereinafter, exemplary embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

Figure 2:
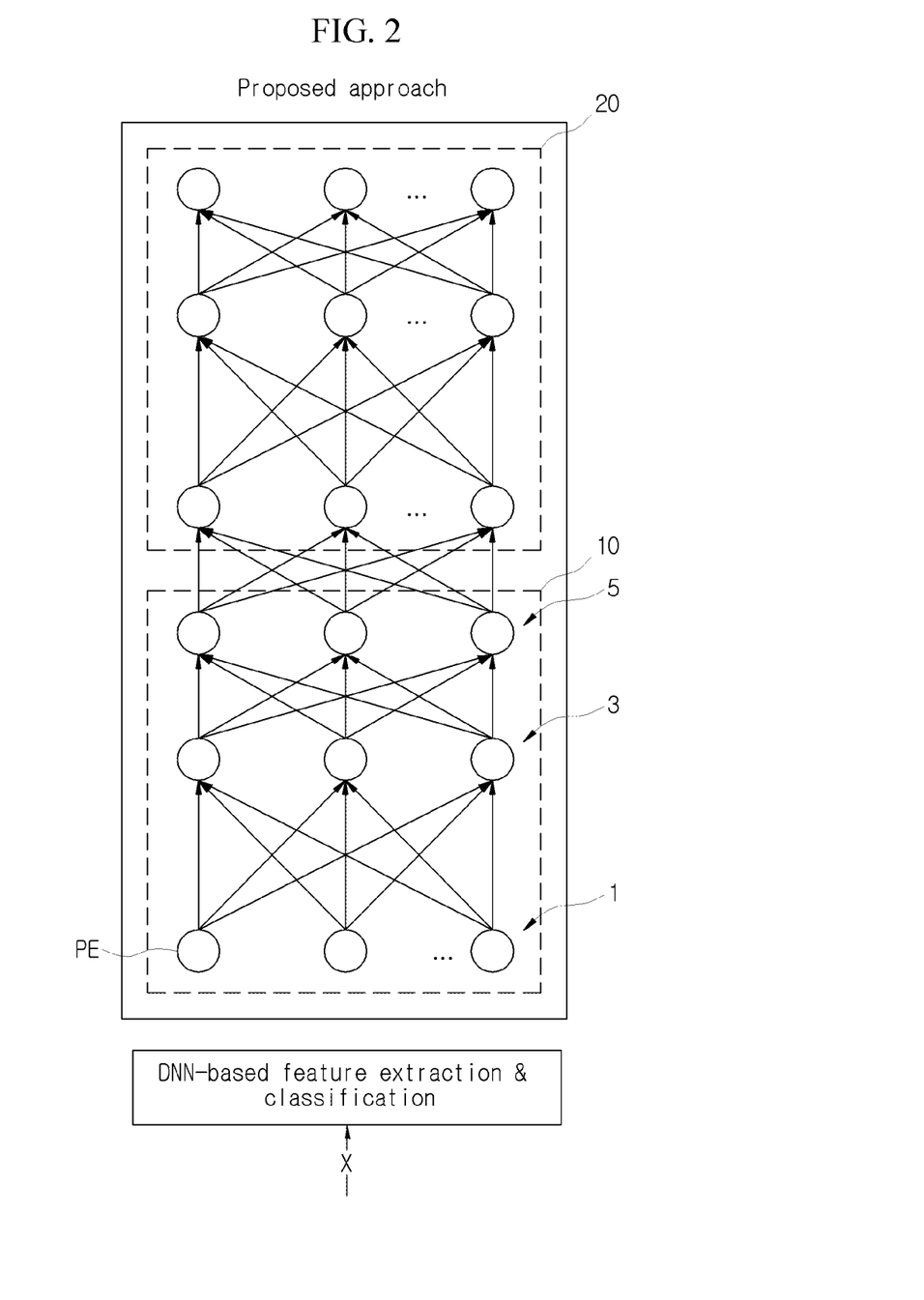
FIG. 2 is a illustrating a signal algorithm-integrated deep neural network (DNN)-based speech recognition apparatus according to an embodiment of the present invention.
Figure 3:
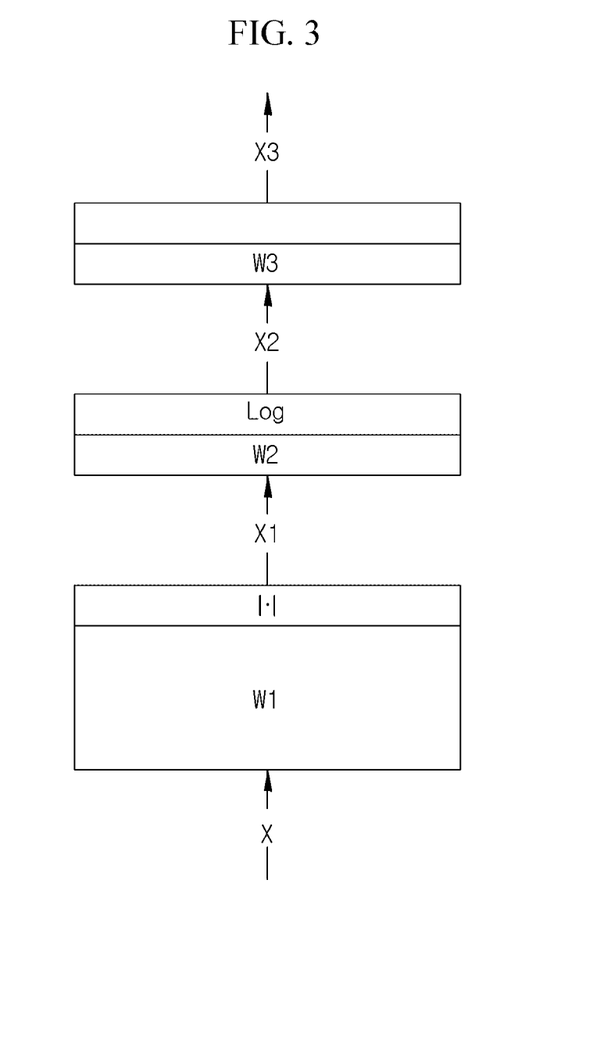
FIG. 3 is a view illustrating a signal processing DNN initialized with a signal processing algorithm coefficient according to an embodiment of the present invention.
Figure 4:
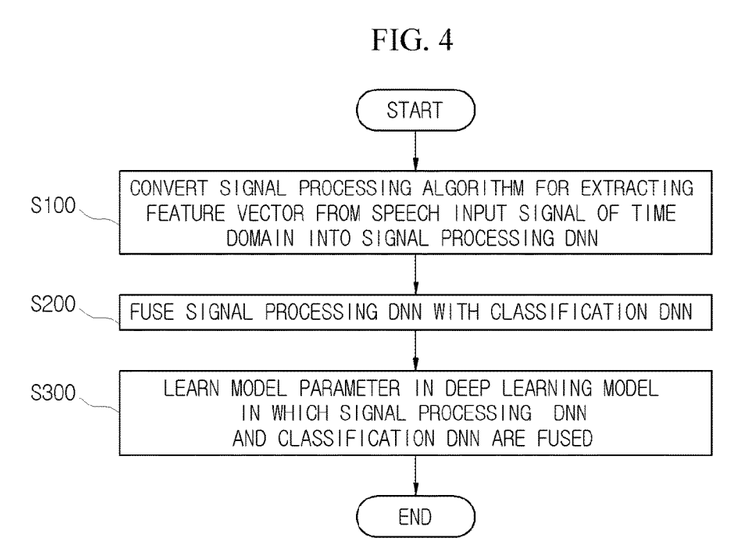
FIG. 4 is a view illustrating a model parameter learning method of the speech recognition apparatus according to an embodiment of the present invention.

FIG. 2 is a illustrating a signal algorithm-integrated deep neural network (DNN)-based speech recognition apparatus according to an embodiment of the present invention, FIG. 3 is a view illustrating a signal processing DNN initialized with a signal processing algorithm coefficient according to an embodiment of the present invention, and FIG. 4 is a view illustrating a model parameter learning method of the speech recognition apparatus according to an embodiment of the present invention.

Referring to FIG. 2, the signal algorithm-integrated DNN-based speech recognition apparatus according to an embodiment of the present invention includes a signal processing DNN 10 and a classification DNN 20.

The signal processing DNN 10 extracts a feature parameter for speech recognition from an input speech signal of a time domain. In an embodiment of the present invention, the signal processing DNN 10 features that a particular signal processing algorithm for speech recognition is expressed on the basis of a deep neural network (DNN).

In detail, the signal processing DNN 10 includes an input layer 1, a hidden layer 3, and an output layer 5 and has an omnidirectional neural network structure. Each layer includes a plurality of nodes, and these nodes are called a processing element (PE). An output value from a node is determined by an activation function output value of the node, and an input of an activation function is weighted sums of all the nodes connected to the node.

Feature parameters for speech recognition may be classified as feature parameters using a feature in a time domain and feature parameters using a feature of a spectrum domain.

Feature parameters using a feature in the time domain include a zero crossing rate (ZCR), a low short-time energy rate (ESTER) measuring a short-term change in energy, and the like, and feature parameters using a feature in the spectrum domain include a spectral centroid using the center of gravity of a spectrum, a spectral flux using a difference between changes in a spectrum, a cepstral distance using a cepstrum distance, a mel frequency cepstral coefficient (MFCC) using non-linear frequency characteristics of human beings' ears, and the like.

Thereamong, the MFCC features that it is based on a spectrum as an effective feature value widely used for speech recognition and uses the nonlinear frequency characteristics of human beings' ears.

Hereinafter, a signal processing procedure for extracting the MFCC as a feature parameter for speech recognition will be discussed, and a method for converting the procedure into the DNN proposed in the present invention will be described.

MFCC (Mel Frequency Cepstral Coefficients)

Referring to FIG. 1, a mel-frequency filter bank feature is extracted through pre-emphasis, windowing, discrete Fourier transform, Mel-frequency filter bank, logarithm procedures. MFCC is extracted when a discrete cosine transform operation is performed on the mel-frequency filter bank feature.

In general, pre-emphasis is designed as a first order high-pass filter strengthening a high frequency component with respect to an input signal x(n).

While a person is producing speech (uttering a voice), articulators are continuously changed according to speech that the person wants to produce, and thus, a vocal track system is a time-variant system varying over time. A signal generated by such a system is also a time-variant signal, making it impossible to analyze a spectrum. However, since a uniform vocal track system is maintained even for a very short moment to produce a sound, the vocal track system may be assumed as being time-invariant for a time of about 10 to 30 ins. Thus, in order to analyze a speech signal, the speech signal needs to be analyzed upon being divided by a time unit of 10 to 30 ms, which is called windowing. Thus, a frame signal x[n] with respect to a continuous speech signal s[n] is defined by Equation (3) shown below.

$$s_t[n]=s[n-t\cdot Q], \quad 0<n<N, \quad 1<t<T$$

$$x[n]=w[n]s_t[n] \quad (3)$$

where, w[n] is a window function and is divided into a rectangular window, a hamming window, and a harming window according to usage forms. The rectangular window is a simplest function, but it has shortcomings in that a spectrum leakage occurs, and thus, in speech signal processing, the hamming window or the harming window is used.

Speech features may also be obtained from cepstrum information, as well as from frequency information. In cepstrum, both envelop information and basic frequency information of a signal appear, and cepstrum is resistant to a change in magnitude of a signal. In particular, cepstrum obtained by applying a filter bank method using a human being's hearing model is called an MFCC and the cepstrum may be obtained by performing cosine conversion on an energy value of each frequency band.

The process of extracting the MFCC described above includes a combination of multiple linear operations and non-linear operations. In an embodiment of the present invention, the signal processing DNN 10 features that it converts a plurality of linear operations forming the signal processing algorithm into a single linear operation and expresses the converted single linear operation on the basis of a DNN.

Here, a matrix inner product or outer product may be used, a signal processing DNN initialized with a signal processing algorithm coefficient is illustrated in FIG. 3.

Referring to FIG. 3, in the signal processing procedure for extracting the MFCC, pre-emphasis, windowing, discrete Fourier transform operations are converted into a single linear operation W1 by a matrix inner product or outer product.

A speech input signal X is output as an X1 value by the converted single linear operation W1, and the X1 value is used as an input with respect to W2 and Log as a single linear operation converted from the mel-frequency filter bank and logarithm operation.

X1 input to the W2 and Log operation is output as X2, and X2 is used as an input with respect to W3 as a single linear operation converted from a discrete cosine transform operation.

Finally, X2 input to the W3 operation is output as X3, and the X3 value is used as an input with respect to the classification DNN 20 as described hereinafter.

Classification DNN 20 performs speech recognition using a feature parameter extracted by the signal processing DNN 10.

The classification DNN 20 is fused with the signal processing DNN 10 to generate a single deep learning model, and here, a feature parameter is used as an input of the classification DNN 20 and a word recognized according to an operation result is output from the classification DNN 20.

Also, the classification DNN 20 features that a classification algorithm for speech recognition is expressed on the basis of a DNN. The classification DNN 20 may also include an input layer, a hidden layer, and an output layer, like the signal processing DNN 10, and a specific operation process performed among the layers is the same as that of the signal processing DNN 10, and thus, a detailed description thereof will be omitted.

A process of adjusting a model parameter in order to generate a target output value with respect to the speech input signal of the time domain from the deep learning model in which the signal processing DNN 10 and the classification DNN 20 are fused is defined by Equation (4) below.

$$W^*=\mathrm{argmax}_{w,\theta_p} P(f(X;\theta_p)) \quad (4)$$

where X denotes a speech input signal of the time domain, $\theta_p$ denotes a model parameter, $f(X;\theta_p)$ denotes a signal processing algorithm for extracting a feature parameter from the speech input signal, and w denotes a target output value.

A model parameter learning method according to an embodiment of the present invention will be described with reference to FIG. 4. FIG. 4 is a view illustrating a model parameter learning method of the speech recognition apparatus according to an embodiment of the present invention.

Referring to FIG. 4, the speech recognition apparatus according to an embodiment of the present invention converts a signal processing algorithm for extracting a feature parameter from a speech input signal of a time domain into a DNN-based signal processor in step S100.

As described above, the signal processing algorithm for extracting a feature parameter from a speech algorithm includes a combination of multiple linear operations and non-linear operations, and here, by converting the plurality of linear operations into a single linear operation using a matrix inner product or outer product, the signal processing algorithm is converted into the signal processing DNN. Here, as an initial value of the signal processing DNN, a general coefficient value used in the signal processing algorithm is used.

Next, the speech recognition apparatus generates a deep learning model in which the signal processing DNN and the classification DNN are fused in step S200.

Step S200 may be performed by using the feature parameter output from the signal processing DNN, as an input with respect to the classification DNN.

Finally, the speech recognition apparatus learns an optimal model parameter ($\theta \downarrow p$) maximizing speech recognition performance in the deep learning model obtained by fusing the signal processing DNN and the classification DNN.

Learning of a model parameter refers to a process of appropriately adjusting a weighted value of the deep learning model in order to generate a target output value when a speech signal is input to the deep learning model. Here, a back-propagation algorithm may be used, and a model parameter with which an error of an output value with respect to the speech input signal of the time domain is minimized is determined.

According to the embodiment of the present invention described above, the signal processing algorithm for extracting a feature parameter is converted into the signal processing DNN and the signal processing DNN is fused with the classification DNN, whereby a model parameter with which both the signal processing procedure and the classification procedure can maximize speech recognition performance can be determined.

Figure 5:
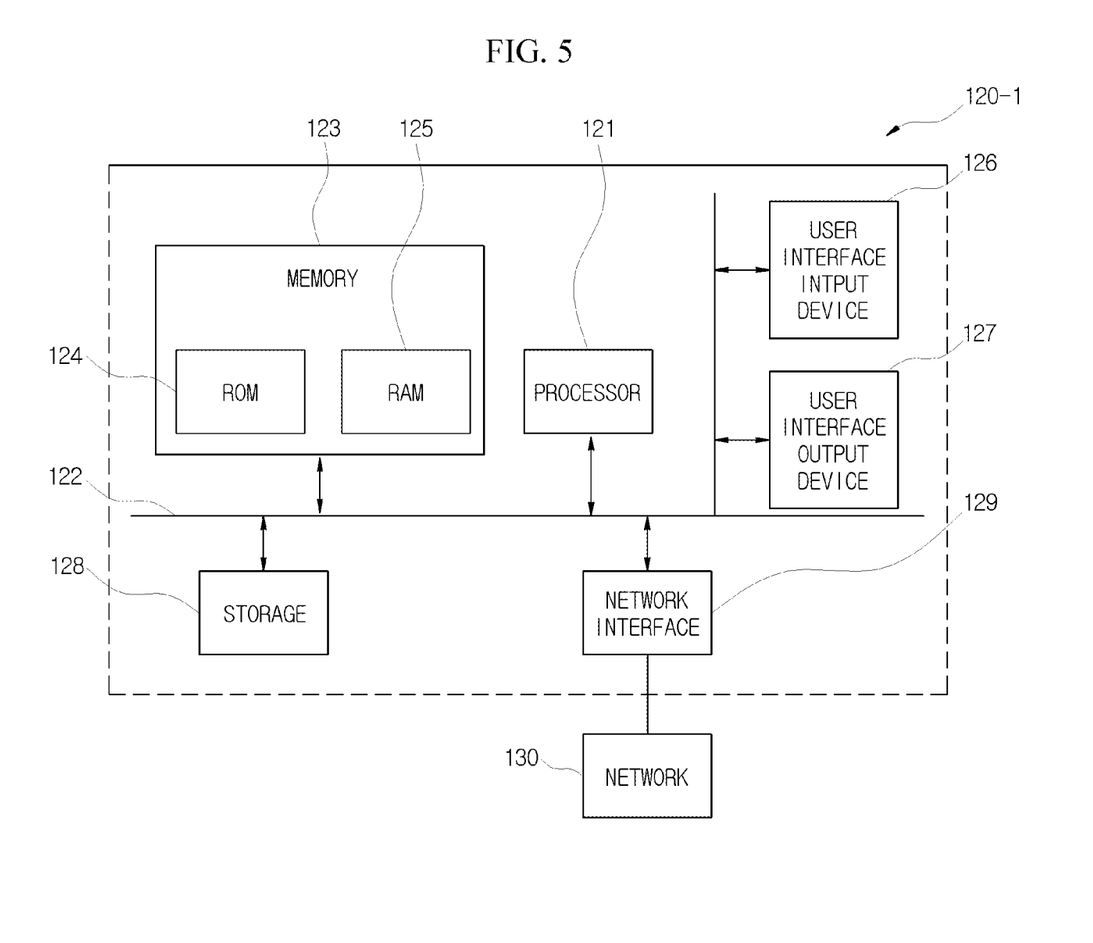
FIG. 5 is a view illustrating a configuration of a computer device in which the model parameter learning method of the speech recognition apparatus according to an embodiment of the present invention is executed.

The model parameter learning method of the speech recognition apparatus according to an embodiment of the present invention may be implemented in a computer system or may be recorded in a recording medium. As illustrated in FIG. 5, a computer system may include at least one processor 121, a memory 123, a user interface input device 126, a data communication bus 122, a user interface output device 127, and a storage 128. The components perform data communication via the data communication bus 122.

The computer system may further include a network interface 129 coupled to a network. The processor 121 may be a central processing unit (CPU) or a semiconductor device processing a command stored in the memory 123 and/or the storage 128.

The memory 123 and the storage 128 may include various types of volatile or nonvolatile storage mediums. For example, the memory 123 may include a ROM 124 and a RAM 125.

Thus, the model parameter learning method of the speech recognition apparatus according to an embodiment of the present invention may be implemented as a computer-executable method. When the model parameter learning method of the speech recognition apparatus according to an embodiment of the present invention is performed in a computer device, computer-readable commands may perform the recognition method according to the present invention.

According to the present invention, by integrating the signal processing algorithm for extracting a feature parameter into the deep neural network-based speech recognition apparatus, a model parameter for maximizing speech recognition performance in both the signal processing procedure and the signal classification procedure can be optimized, enhancing speech recognition performance.

The model parameter learning method of the speech recognition apparatus according to the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A speech recognition method performed by a deep neural network (DNN)-based speech recognition apparatus implementable by a computer, the speech recognition method comprising:
   performing a model parameter learning method comprising:
      converting a signal processing algorithm into a signal processing deep neural network (DNN), the signal processing algorithm being for extracting a feature parameter from a speech input signal of a time domain, converting the signal processing algorithm including:
         converting pre-emphasis, windowing, and discrete Fourier transform operations of the signal processing algorithm into a first single linear operation (W1),
         converting a mel-frequency filter bank and a logarithm operation of the signal processing algorithm into a single linear and log operation (W2), and
         converting a discrete cosine transform operation of the signal processing algorithm into a second single linear operation (W3);
      initializing the signal processing DNN with a signal processing algorithm coefficient;
      converting a speech input signal (X) to a first value (X1) using the first single linear operation (W1);
      converting the first value (X1) to a second value (X2) using the single linear and log operation (W2);
      converting the second value (X2) to a third value (X3) using the second single linear operation (W3);
      outputting the third value (X3);
      using the third value (X3) as an input with respect to a classification DNN;
      fusing the signal processing DNN and the classification DNN to create a deep learning model;
      receiving the speech input signal; and
      learning, using the speech input signal of the time domain, a model parameter in the deep learning model; and
   performing speech recognition using the deep learning model having the learned model parameter to output a word recognized by the deep learning model.

2. The speech recognition method of claim 1, wherein the converting a signal processing algorithm comprises: converting a plurality of linear operations forming the signal processing algorithm into a single linear operation by using a matrix inner product or outer product.

3. The speech recognition method of claim 1, wherein the fusing the signal processing DNN and a classification DNN comprises: inputting a feature parameter output from the signal processing DNN to the classification DNN.

4. The speech recognition method of claim 1, wherein the learning a model parameter comprises: adjusting a model parameter to generate a target output value with respect to the speech input signal of the time domain.

5. The speech recognition method of claim 4, wherein the learning a model parameter comprises: determining a model parameter with which an error of an output value with respect to the speech input signal of the time domain is minimized by using a back-propagation learning algorithm.

6. A signal processing algorithm-integrated deep neural network-based speech recognition apparatus including at least one processor and a non-volatile memory storing a code executed by the at least one processor, wherein the processor:
  converts a signal processing algorithm into a signal processing deep neural network (DNN), the signal processing algorithm being for extracting a feature parameter from a speech input signal of a time domain, converting the signal processing algorithm including:
    converting pre-emphasis, windowing, and discrete Fourier transform operations of the signal processing algorithm into a first single linear operation (W1),
    converting a mel-frequency filter bank and a logarithm operation of the signal processing algorithm into a single linear and log operation (W2), and
    converting a discrete cosine transform operation of the signal processing algorithm into a second single linear operation (W3),
  initializes the signal processing DNN with a signal processing algorithm coefficient;
  converts a speech input signal (X) to a first value (X1) using the first single linear operation (W1);
  converts the first value (X1) to a second value (X2) using the single linear and log operation (W2);
  converts the second value (X2) to a third value (X3) using the second single linear operation (W3);
  outputs the third value (X3); and
  uses the third value (X3) as an input with respect to a classification DNN
  fuses the signal processing DNN and the classification DNN to form a deep learning model,
  receives a speech input signal of the time domain,
  learns, using the speech input signal of the time domain, a model parameter in the deep learning model, and
  performs speech recognition using the deep learning model having the learned model parameter to output a word recognized by the deep learning model.

7. The signal processing algorithm-integrated deep neural network-based speech recognition apparatus of claim 6, wherein the processor converts a plurality of linear operations included in the signal processing algorithm into a single linear operation by using a matrix inner product or outer product.

8. The signal processing algorithm-integrated deep neural network-based speech recognition apparatus of claim 6, wherein the processor inputs the feature parameter output from the signal processing DNN to the classification DNN.

9. The signal processing algorithm-integrated deep neural network-based speech recognition apparatus of claim 6, wherein the processor adjusts a model parameter to generate a target output value with respect to the speech input signal of the time domain.

10. The signal processing algorithm-integrated deep neural network-based speech recognition apparatus of claim 9, wherein the processor determines a model parameter with which an error of an output value with respect to the speech input signal of the time domain is minimized by using a back-propagation learning algorithm.

* * * * *